United States Patent [19]
Gautier et al.

[11] Patent Number: 5,787,788
[45] Date of Patent: Aug. 4, 1998

[54] BOOSTER EQUIPPED WITH AN ALTERABLE-FLOWRATE ADDITIONAL AIR INTAKE

[75] Inventors: Jean Pierre Gautier; Ulysse Verbo, both of AulNay-Sous-Bois, France

[73] Assignee: Bosch Systems De Freinage, Drancy, France

[21] Appl. No.: 663,154
[22] PCT Filed: Oct. 12, 1995
[86] PCT No.: PCT/FR95/01327
§ 371 Date: Nov. 13, 1995
§ 102(e) Date: Nov. 13, 1995
[87] PCT Pub. No.: WO96/17757
PCT Pub. Date: Jun. 13, 1996

[30] Foreign Application Priority Data

Dec. 9, 1994 [FR] France .................. 94 14810

[51] Int. Cl.⁶ .................................. F15B 9/10
[52] U.S. Cl. .............. 91/376 R; 91/369.1; 91/369.2
[58] Field of Search ................. 91/6, 31, 369.1, 91/369.2, 376 R, 24

[56] References Cited

U.S. PATENT DOCUMENTS 5,249,504  10/1993  Gautier et al. .............. 91/376 R
5,279,203   1/1994  Gautier et al. .............. 91/369.1

*Primary Examiner*—Thomas E. Denion
*Assistant Examiner*—Bujan N. Karimi
*Attorney, Agent, or Firm*—Leo H. McCormick, Jr.; Warren Comstock

[57] ABSTRACT

A pneumatic brake booster (1) having a piston (5) which is responsive to first and second sources of air pressure. The booster (1) has a rigid casing (3) which is divided by a leaktight movable partition (4) into first (3a) and second (3b) chambers. The partition (4) including a pneumatic piston (5) which carries a control valve (7). A difference in pressure established between the first (3a) and second (3b) chambers causes the piston (5) to move within the casing (3). The inside (50) of the piston (5) is separated from the second source of air pressure by an impurities filter (14). A closing-off means (15,17) is located between an opening to the inside (50) of the piston (5) and the second source of air pressure to control an air inlet path which bypasses the impurities filter (14). An elastic means (18) acts on and opens the closing-off means (15,17) to allow the second source of air pressure to enter the inside (50) of the piston (5) when a difference between the air pressure on the inside (50) of the piston (5) and the second source of air pressure exceeds a given threshold.

3 Claims, 4 Drawing Sheets

BOOSTER EQUIPPED WITH AN ALTERABLE-FLOWRATE ADDITIONAL AIR INTAKE

The present invention relates to a pneumatic brake booster using first and second sources of air pressure delivering first and second respective and different pressures, this booster comprising a rigid casing divided by at least one leaktight movable partition into at least two chambers, the first of which is connected to the first source, and the second of which is capable of being connected selectively, by means of a valve, to either one of the two sources, the movable partition being capable of being urged by the difference between the pressures established in the chambers so as to entrain an essentially cylindrical pneumatic piston which slides in leaktight fashion inside the casing and carries the valve, the inside of this piston and especially the valve being separated from the second source by an impurities filter.

Devices of this type, which are well known in the prior art, are used on a very great number of motor vehicles nowadays.

Despite the conventional nature of the techniques involved, boosters continue to form the subject of considerable research, aiming to optimize their operating characteristics.

Included in this research there feature, in particular, attempts to reduce both the level of noise of boosters in operation, and their response time when acted upon, a simultaneous reduction in these two parameters being made very tricky by the fact that a booster is quieter if the air it takes into the rear chamber is more filtered, while it exhibits a shorter response time if the air which it takes in is less filtered.

The invention falls within this context and its object is to provide a booster which meets the expectations of the public as regards the reduction in the level of noise in operation, while offering a response time which is at least as satisfactory as those of the boosters of the prior art, in all cases where the need for a short response time is felt.

To this end, the booster of the invention is essentially characterized in that it includes closing-off means, the opening of which is controlled, installed between the second pressure source and the inside of the piston and controlling an air inlet path which avoids passing through the filter, and elastic means, which are sensitive to a difference in pressure between the inside of the piston and the second source of pressure, in order to allow the closing-off means to be opened selectively when this pressure difference exceeds a given threshold.

According to a first possible embodiment, in which the valve is controlled by a control rod, the booster of the invention is characterized in that the filter adopts the shape of a cylinder surrounding the control rod, in that the closing-off means comprise a valve seat formed at the internal periphery of the piston and a flexible annular seal closing off a gap between the filter and the valve seat and bearing on the latter, and in that the elastic means comprise a spring pressing the seal onto the valve seat, against a force which may be exerted on this seal by the difference in pressure between the inside of the piston and the second source of pressure.

According to a second possible embodiment, in which the pneumatic piston is housed, outside the casing, in a protective tubular gaiter made at least partially from a porous elastomeric material and acting as a filter, the booster of the invention is characterized in that the closing-off means comprise at least one lip produced in the form of a slit made in the porous gaiter, and in that the elastic means comprise at least one elongate spur formed in the gaiter and exhibiting edges which converge towards the said slit and keep it elastically closed for as long as the pressure difference between the inside of the piston and the second pressure source is below the said given threshold.

Other features and advantages of the invention will emerge clearly from the description thereof which is given below, by way of non-limiting indication, with reference to the appended drawings, in which.

Figure 1:
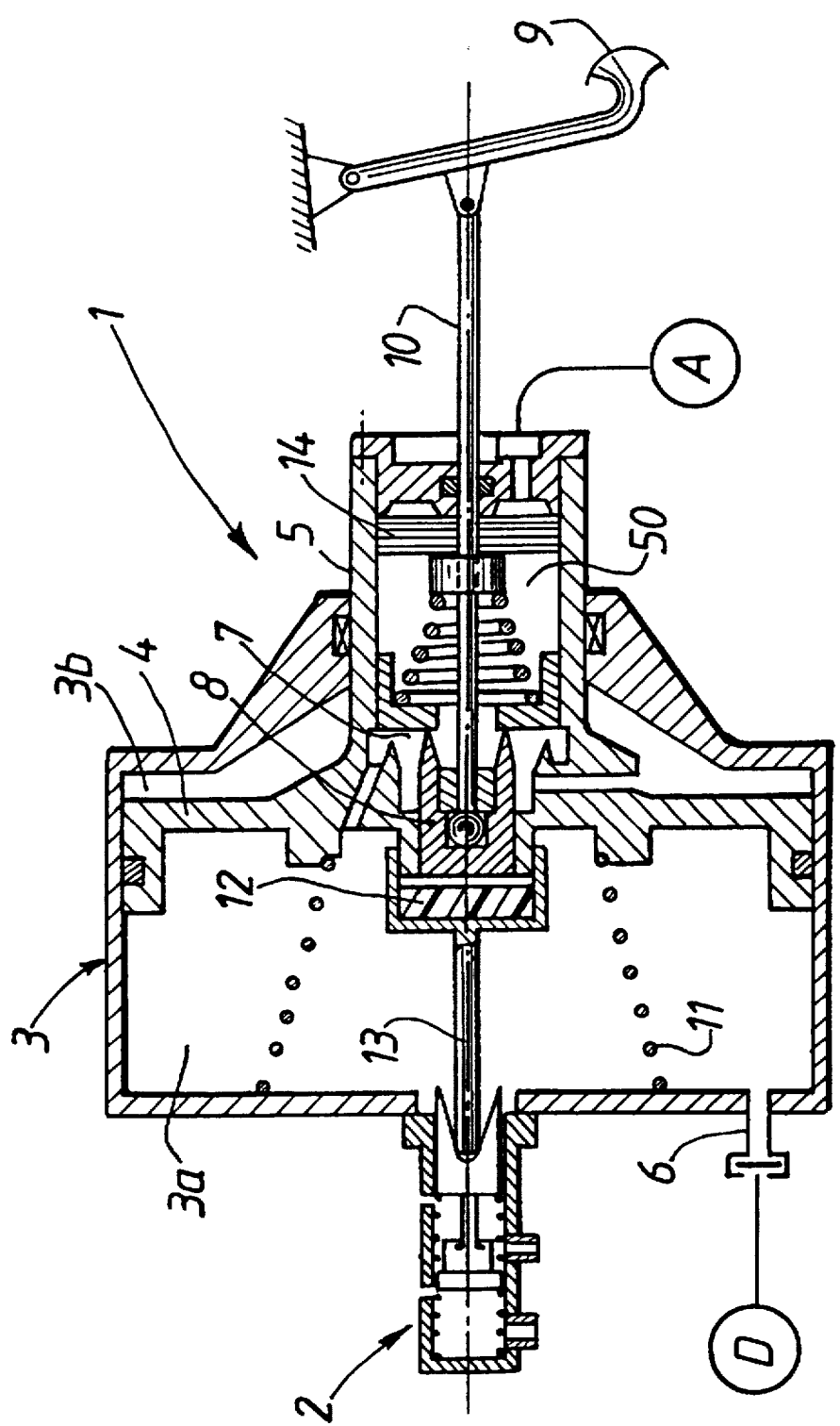
FIG. 1 is a diagrammatic view in section of a pneumatically boosted braking system using a conventional booster.

Insofar as the invention relates merely to an improvement made to pneumatically boosted braking systems, and as the general construction and operation of the latter are well known to the expert, these systems will be recalled here only briefly to allow a complete understanding of the improvement which the invention represents.

In essence, a system of this type comprises a booster 1 and a master cylinder 2.

The booster itself comprises a rigid casing 3 divided into two chambers 3a and 3b in leaktight fashion by a movable partition 4 capable of entraining an essentially cylindrical pneumatic piston 5 which can move inside the casing 3.

The front chamber 3a, the front face of which is closed in leaktight fashion by the master cylinder 2, is permanently coupled to a source D of low pressure through a non-return valve 6.

In contrast, the rear chamber 3b can be coupled selectively either to the source D of low pressure, or to a source of high pressure, for example to the atmosphere A. To this end, access to the rear chamber 3b is controlled by a valve 7 and a plunger 8, the latter being connected to a brake pedal 9 via a control rod 10.

When the control rod 10 is in the position of rest, in this case pulled to the right, the valve 7 normally establishes a communication between the two chambers 3a and 3b of the booster.

As the rear chamber 3b is then subjected to the same partial vacuum as the front chamber 3a, the piston 5 is pushed back to the right, into the position of rest, by a return spring 11. Actuation of the plunger 8 through a movement of the control rod 10 to the left has the effect, firstly, of displacing the valve 7 so that it isolates the chambers 3a and 3b from each other then, secondly, of displacing this valve so that it opens the rear chamber 3b to atmospheric pressure A.

The difference in pressure between the two chambers, which is then felt by the movable partition 4, exerts a thrust force on the latter which tends to displace it towards the left and allow it to entrain the piston 5 which is in turn displaced, compressing the spring 11.

The braking force exerted on the plunger 8 by the control rod 10, or "input force", and the brakeboosting force, or "boost force", resulting from the thrust of the movable partition 5 are added together on a reaction disk 12 to constitute an actuation force transmitted to the master cylinder via a push rod 13.

As FIG. 1 shows, the booster conventionally comprises an impurities filter 14 which is intended to avoid any pollution by the atmosphere A of the inside 50 of the pneumatic piston, of the valve 7, and of the rear chamber 3b.

Although such a filter is necessary at least for attenuating the operating noise of the booster, it slows down the air flow which the latter can use and impairs the response time of the booster in a way which is correspondingly greater as it provides better acoustic insulation.

In order to overcome this problem, the booster of the invention includes closing-off means, the opening of which is controlled, installed between the second pressure source A and the inside 50 of the piston and controlling an air inlet passage which avoids passing through the filter 14, and elastic means which are sensitive to a difference in pressure between the inside 50 of the piston and the second pressure source A in order to allow the closing-off means to be opened selectively when this pressure difference exceeds a given threshold.

Figure 2:
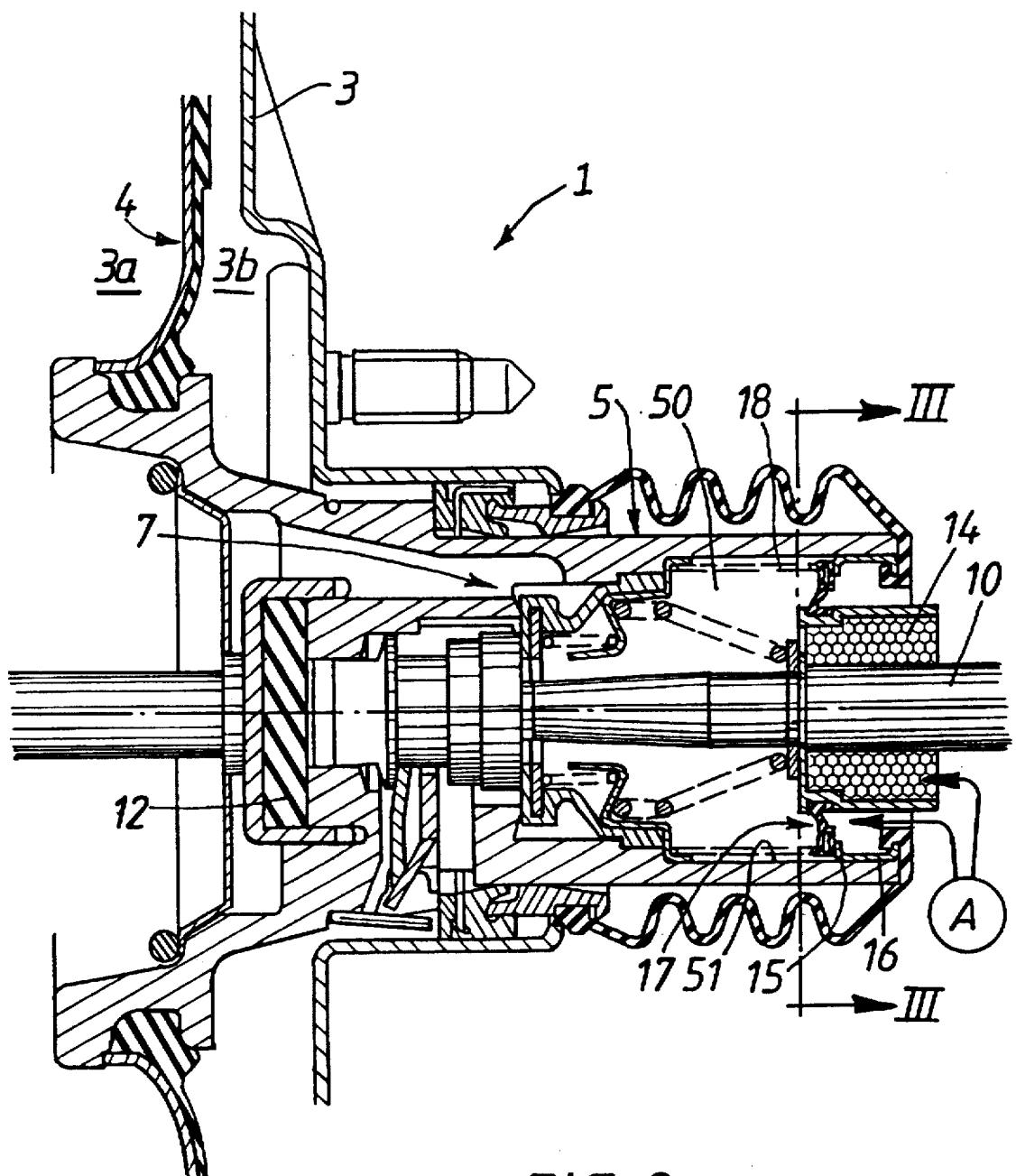
FIG. 2 is a view in partial section of a booster in accordance with a first embodiment of the invention.
Figure 3:
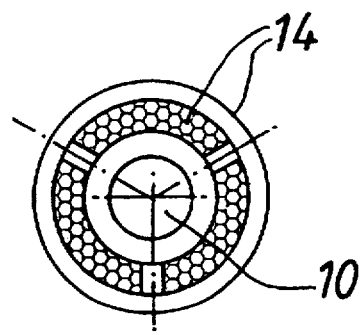
FIG. 3 is a partial section view on III—III of FIG. 2.

For example, according to the embodiment of FIG. 2 and 3, in which the filter 14 adopts the shape of a cylinder surrounding the control rod 10, the closing-off means comprise a valve seat 15 formed at the internal periphery 51 of the piston by a ring 16, and a flexible annular seal 17 integral with the filter 14 via its internal edge and bearing via its periphery on the valve seat 15 in order to close off the gap defined between this filter and this seat, while the elastic means comprise a spring 18 pressing the seal 17 onto the valve seat 15, against the force which is exerted on this seal by the difference in pressure, when such exists, between the inside 50 of the piston and the second pressure source A.

The operation of this booster is as follows.

When the booster is acted upon abruptly, the suction force exerted by the source D of partial vacuum on the movable partition 4 causes a substantial instantaneous pressure drop inside 50 of the piston 5 with respect to the second pressure source A. The intensity of this pressure drop is stronger, the greater the resistance offered by the filter 14 to the passage of air.

Under these conditions, the flexible seal 17, the two faces of which are subjected to different pressures, is subjected to a force which, if greater than the force exerted by the spring 18, detaches the periphery of the seal 17 from the seat 15 against the force exerted by this spring and thus offers the air free passage between the second source A and the inside 50 of the piston 5.

If, on the other hand, the booster is acted upon progressively, the difference in pressure between the inside 50 of the booster and the second source A remains modest and the force to which the flexible seal 17 is subjected is insufficient to overcome the force that the spring 18 exerts on this seal, applying it onto the seat 15.

As the expert will easily understand, these provisions make it possible to optimize the response time and the level of noise of the booster in operation, while making it possible to obtain a minimum response time in emergency braking situations which require such a response time and in which the comfort of a low noise level is of no importance, and reducing the level of noise in situations in which increasing the response time due to the air having to pass through the filter is of no consequence, in which situations the booster is acted upon too slowly to be able to take advantage of a very short response time.

Figure 5:
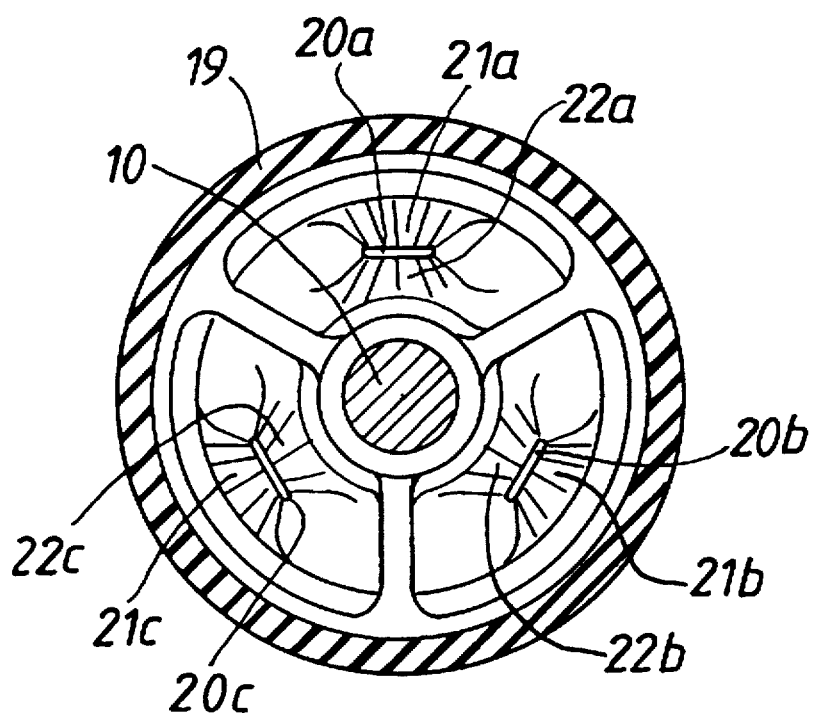
FIG. 5 is a partial section view on V—V of FIG. 4.
Figure 4:
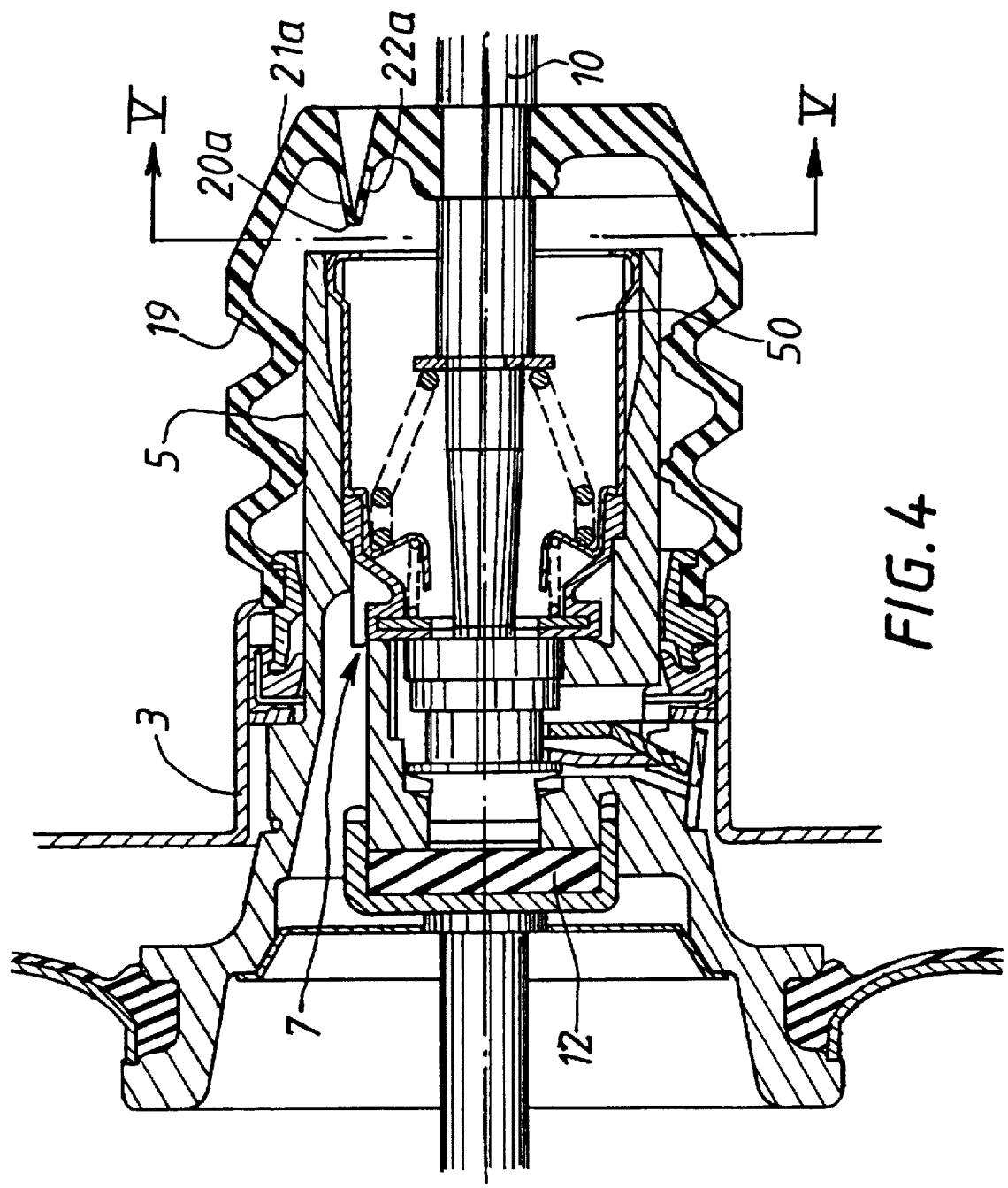
FIG. 4 is a view in partial section of a booster in accordance with a second embodiment of the invention.

In the embodiment of FIGS. 4 and 5, in which the pneumatic piston 5 is housed., outside the casing, in a protective tubular gaiter 19 made at least partially of a porous elastomeric material and acting as a filter, the closing-off means advantageously comprise at least one lip produced in the form of a slit, such as 20a, 20b, 20c, made in the porous gaiter 19, and the elastic means comprise at least one elongate spur formed in the gaiter and exhibiting edges such as 21a, 22a, 21b, 22b, 21c, 22c which converge towards the slit 20a, 20b, 20c and keep it elastically closed for as long as the difference in pressure between the inside 50 of the piston and the second pressure source A is below a given threshold.

As the expert will easily understand, the operating principle for the second embodiment is identical to that of the first, namely that the direct and additional air passage offered by the lips 20a, 20b and 20c between the second source a and the inside 50 of the booster opens only when the booster is acted upon abruptly, that is to say in the case of a braking action requiring as short a response time as possible.

We claim:

1. A pneumatic brake booster having first and second sources of air pressure with first and second respective and different pressures, said booster comprising a rigid casing divided by at least one leaktight movable partition into at least first and second chambers, said first chamber being connected to said first source of air pressure, said second chamber being selectively connected through valve means to one of said first and second sources of air pressure, said movable partition being capable of being urged by a difference between pressures established in said first and second chambers so as to drive an essentially cylindrical pneumatic piston which slides in leaktight fashion inside the casing and carries the valve means, said piston having an inside area and said valve means being separated from said second source of air pressure by an impurities filter, said impurities filter being characterized by closing-off means and elastic means, said closing-off means including a controlled opening which is installed between said second source of air pressure and said inside area of said piston, said closing-off means controlling an air inlet path which avoids passing through said impurities filter, said elastic means being sensitive to a difference in pressure present at said inside area of the piston and said second source of air pressure, said elastic means allowing said closing-off means to be opened selectively when said pressure difference exceeds a given threshold.

2. The pneumatic booster according to claim 1, wherein said valve means is controlled by a control rod, and wherein said impurities filter adopts a shape of a cylinder which surrounds said control rod, and wherein said closing-off means has a valve seat formed on an internal periphery of said piston and a flexible annular seal for closing off a gap between said impurities filter and said valve seat, said annular seal bearing on said valve seat, and wherein said elastic means has a spring which presses said annular seal onto said valve seat in opposition to a force which may be exerted on said annular this seal by a difference in pressure located on the inside area of said piston and said second source of air pressure.

3. The pneumatic booster according to claim 1, wherein said pneumatic piston is housed on the outside said casing in a protective tubular gaiter made at least partially from a porous elastomeric material, said porous elastomeric material acting as a filter, and wherein said closing-off means comprise at least one lip produced in the form of a slit made in said porous gaiter, and said elastic means comprise at least one elongated spur formed in said gaiter, said elongated spur having exhibiting edges which converge towards said slit to keep said slit elastically closed for as long as a difference in air pressure between the inside area of said piston and said second source of air pressure is below the said given threshold.

* * * * *